United States Patent Office  3,483,194
Patented Dec. 9, 1969

3,483,194
ACYL DERIVATIVES OF 2-METHYL-5-HYDROXY-8-(β-DIETHYLAMINO-ETHOXY) - FURO-(2',3':6,7)-CHROMONE
Carlo Musante, Via Domenico Buonvicini 13, Florence, Italy, Leonardo Donatelli, Via Tasso 480, Naples, Italy, and Bruno Lotti, Via Cimarosa 23, Florence, Italy
No Drawing. Continuation-in-part of application Ser. No. 258,174, Feb. 13, 1963. This application Nov. 29, 1966, Ser. No. 597,519
Claims priority, application Italy, Feb. 17, 1962, 2,988/62
Int. Cl. C07d 5/14, 7/36
U.S. Cl. 260—240                                     2 Claims

ABSTRACT OF THE DISCLOSURE

Acyl derivatives of 2-methyl-5-hydroxy-8-(β-diethylamino-ethoxy)-furo-(2',3':6,7)-chromone, and a process for preparing the same, are disclosed. The compounds are prepared by reacting the 2-methyl-5-hydroxy-8-(β-diethylamino-ethoxy)-furo-(2',3':6,7)-chromone, with an acyl chloride, in the presence of pyridine, in a two-stage reaction at a first temperature of from about −5° C. to about 10° C., and a second stage temperature of about 100° C. to about 140° C. to complete the reaction. The acyl derivatives, and especially the nicotinic acid and the pyridyl-3-acrylic derivatives, are therapeutically useful for coronary-extending and antispastic purposes.

---

This is a continuation-in-part of our patent application Ser. No. 258,174, now abandoned.

This invention relates to a series of acyl derivatives of 2 - methyl-5-hydroxy-8-(β-diethylamino-ethoxy)-furo-(2', 3':6,7)-chromone, and to a process for the preparation thereof.

It is an object of this invention to provide acyl derivatives of 2-methyl-5-hydroxy-8-(β-diethylamino-ethoxy)-furo-(2',3':6,7)-chromone and mineral acid salts, organic acid salts, and quaternary ammonium salts thereof. An additional object of the present invention is to provide a process for the production of acyl derivatives of 2-methyl-5 - hydroxy - 8-(β-diethylamino-ethoxy)-furo-(2',3':6,7)-chromone and mineral acid salts, organic acid salts, and quaternary ammonium salts thereof. A further object of the present invention is to provide the therapeutic use of acyl derivatives of 2-methyl-5-hydroxy-8-(β-diethylamino-ethoxy)-furo-(2',3':6,7)-chromone and mineral acid salts, organic acid salts, and quaternary ammonium salts thereof.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

The compounds of the present invention may be represented by the generic formula:

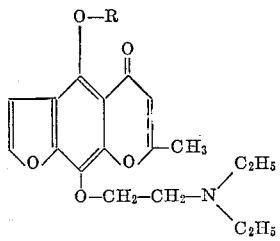

(Formula I)

wherein R represents an aliphatic, aromatic or heterocyclic acid radical. In the preferred embodiment of the present invention, R represents the radicals of nicotinic acid and the vinyl homologue of nicotinic acid, i.e., the pyridyl-3-acrylic radical. The aliphatic group in the aliphatic acid radical represented by R may be a radical of one to 16 carbon atoms in length, e.g., methyl, ethyl, propyl, butyl, octyl, dodecyl, hexadecyl, 2-ethyl hexyl, iso-butyl, butylene, hexene, etc. The aromatic group in the aromatic acid radical represented by R may be, for example, benzyl, naphthyl, o-, m- or p-diethylbenzyl, tolyl, xylyl, phenyl, phenethyl, p-xenyl, benzhydryl, etc., radicals. Preferably, the aromatic acid radical represented by R is a substituted benzoyl radical wherein the substituents are halogen, such as chlorine, nitro, and alkoxy radicals, wherein the alkyl chain in the alkoxy radical contains 1 to 10 carbon atoms, e.g., the radical is methyl, butyl, octyl, decyl, etc. The heterocyclic acid radical represented by R may be, for example, the nicotinic acid radical, the pyridyl-3-acrylic radical, the pyrrole radical, the pyrazole radical, the imidazole radical, the thiazole radical, the tetrazole radical, the pyrazoline radical, the imidazolidine radical, the indole radical, the carbazole radical, the benzothiazole radical, the quinoline radical, the acridine radical, etc. Particularly preferred heterocyclic radicals are those with at least one nitrogen atom in the heterocyclic ring, and the heterocyclic radical may contain one or more 5 or 6 membered rings, and preferably one 6-membered ring.

The compounds represented by the generic Formula I above have been proved to possess outstanding coronary-extending and antispastic properties, especially where R is just the nicotinic or pyridyl-3-acrylic radical, i.e.,

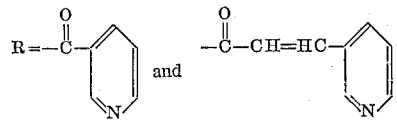

The compounds having the above general Formula I can be prepared, according to the present invention, by reacting 2-methyl-5-hydroxy-8-(β-diethylamino-ethoxy)-furo-(2',3':6,7)-chromone (general Formula I, wherein R=H) with acyl halides, particularly with nicotinic and pyridyl-3-acrylic acid chlorides. Acyl chlorides are particularly preferred, and such acyl radicals correspond to the aliphatic, aromatic, or heterocyclic acid radicals represented by R; that is, the acyl radical is of the formula RX, wherein R has the same definition as in Formula I and X is a halide, preferably a chloride.

The reaction is preferably carried out in the presence of an acid-acceptor, for example pyridine; this latter compound may be used in an excess and may act as the solvent. The reaction temperature may range from −10° C. to +150° C., a temperature of about −5° C. to +10° C. being the preferred one at the beginning of the reaction, which is then completed by heating to higher temperatures, for example 100–140° C. The reaction, which is suitably accomplished with stirring, is preferably carried out under a nitrogen atmosphere. In addition to pyridine, suitable solvents for carrying out the reaction are, for example, aromatic hydrocarbons such as benzene, toluene and the like.

The starting compound 2-methyl-5-hydroxy-8-(β-diethylamino-ethoxy)-furo-(2',3':6,7) chromone contains a group of the formula —N=(C₂H₅)₂ which is more basic than the pyridine nitrogen so that the reaction would stop at its mid-point as the pyridine would not have the properties of keeping the formed hydrochloride of the starting compounds in a warm solution. The two step reaction temperature is critical to obtain good yield and almost pure products directly from the reaction mixture. At the first step of reaction (with a temperature of about 0° C.), the acid chloride and the parent compound partially react to release hydrochloric acid, which is fixed between basic groups of both the starting compound and the final product. The completion of the reaction takes place by slowly warming the mixture until it reaches the boiling point so that the reaction proceeds gradually.

In both stages of reaction, pyridine acts as a solvent.

The final stage of the reaction at a high temperature completes the reaction and serves to destroy the excess acid chloride. The pyridine now acts as an acid-acceptor. The process is carried out in a nitrogen atmosphere in order to protect the hydroxyl group of the starting compound, which is sensitive, in a basic medium, to oxidation. Although it is possible to obtain the same final products with other solvents and other acid-acceptors, the yields obtained in such cases are much smaller and the final products so obtained are contaminated to varying degrees by the starting compound. Therefore, the two-step temperature limitation and the use of pyridine are critical to the successful use of the present process.

After the acylation is completed, the product can be separated by usual procedures, for example, by dissolving the mixture into water, alkalizing the resulting solution and filtering or extracting with proper solvents the acyl derivative, and so on.

The reaction products may be easily purified by recrystallization and converted into their salts by well-known methods. Suitable salts are, for example, hydrochloric, nitric, and sulfuric acid salts and quaternary ammonium salts. Organic acid salts, such as picric acid salts, may also be utilized. When quaternary ammonium salts are utilized, the anion may be, for example, a halogen atom, such as a chloride or iodide atom. Suitable organic substituents on the nitrogen atom of the quaternary ammonium salts may be alkyl radicals of 1–10 carbon atoms in length such as methyl, ethyl, butyl, octyl, etc., alkaryl radicals such as benzyl and phenethyl radicals, and aromatic radicals such as the phenyl and tolyl radicals.

The invention will be understood more redily by reference to the following examples; however, these examples are intended to illustrate the invention and are not to be construed to limit the scope of the invention.

EXAMPLE I

2 - methyl - 5 - (pyridyl - 3 - carbonyl)oxy - 8 - ($\beta$-diethylamino-ethoxy)-furo-(2',3':6,7)-chromone:

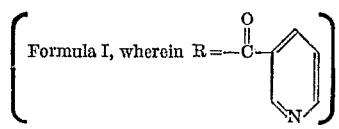

To an ice cooled solution of 5 gr. of 2-methyl-5-hydroxy-8-($\beta$-diethylamino-ethoxy)-furo-(2',3':6,7) chromone in 20 ml. of anhydrous pyridine, 3 gr. of nicotinic acid chloride-hydrochloride were added by portions while stirring.

After the addition was completed, the reaction mixture was stirred for further 30' and then heated in an oil bath for one hour. The pyridine was distilled under vacuum and the residue was extracted with dioxan.

After crystallization from dioxan a white product was obtained which was separated by filtration at the pump and dissolved into distilled water.

The aqueous solution was alkalized with 10% $Na_2CO_3$ to give an oily precipitate which was extracted with ether. The ethereal solution was washed with distilled water and dried over $Na_2SO_4$. The solvent was evaporated and the residue was crystallized from ligroin to give a white product melting at 115–117° C. in a yield of 5 gr.

EXAMPLE II

2 - methyl - 5 - (pyridyl - 3 - acryloyl)oxy - 8 - ($\beta$-diethylamino-ethoxy)-furo-(2',3':6,7)-chromone:

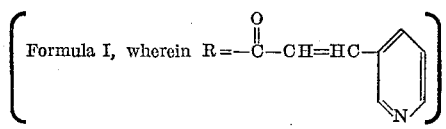

To a ground-glass jointed four-necked flask fitted with a reflux condenser, stirrer, nitrogen inlet tube and thermometer, were added 25 gr. of 2-methyl-5-hydroxy-8-($\beta$-diethylamino-ethoxy)-furo-(2',3':6,7)-chromone and 75 ml. of pyridine. After the reaction mixture was thoroughly stirred in a nitrogen stream to dissolve the most product, 15 gr. of finely powdered 3-pyridyl-acrylic acid chloride were added in small portions. The reaction mixture was stirred for further 2 hours in a nitrogen stream and then allowed to stand overnight. The reaction mixture was gradually heated, in an oil bath, to about 120–125° C. within an hour, and this temperature was maintained for further 1 hour, always with stirring.

The flask was cooled to 30° C. and the red-brown mass was recovered by suction filtration and washed with ice-cooled pyridine.

The filter cake was well pressed to substantially remove the pyridine, washed with 20 ml. of dry methyl alcohol and then poured into 200 ml. of distilled water to obtain a light red-brown colored solution. After this solution was adjusted with alkali to pH=9, the base precipitated as an oil, which slowly crystallized, by rubbing. The so obtained base was separated by filtration at the pump, washed with ice-water, crystallized from ligroin-xylene (35%–65%) at the boiling point in the presence of animal charcoal to give a white colored product; M.P. 125–126° C. The yield was 27.5 gr.

EXAMPLE III

2 - methyl - 5 - (acetyloxy) - 8 - ($\beta$ - diethylaminoethoxy)-furo-(2',3':6,7) chromone hydrochloride.

(Formula I, where R is —OC—$CH_3$)

5 grams 2 - methyl - 5 - hydroxy-8-($\beta$-diethylamino-ethoxy)-furo-(2',3';6,7) chromone is dissolved in 10 cc. anhydrous pyridine; then, 1.5 gr. acetyl chloride is added little by little while stirring. Once the addition is completed, the reaction mixture is stirred for 30 minutes; then, it is warmed in an oil bath for 15 minutes.

On cooling, a solid precipitate forms, which is filtered at the pump and washed with a small amount of cold pyridine. It is recrystallized from ethanol to form a white solid with a melting point of 171–173° C.

EXAMPLE IV

2 - methyl - 5 - (phenyl - acryloyl - oxy) - 8 - ($\beta$ - diethylamino-ethoxy)furo-(2',3':6,7) chromone.

(Formula I, where R is —OC—CH=HC—$C_6H_5$)

25 grams 2 - methyl-5-hydroxy-8-($\beta$-diethylamino-ethoxy)-furo-(2',3':6,7) chromone is dissolved in 50 cc. anhydrous pyridine, in a four-necked flask fitted with agitator, reflux cooler, dropping funnel and bubbling pipe.

After the reaction mixture has been stirred under nitrogen, and cooled to 0° C., 14 gr. phenylacrylic acid chloride is added slowly. Once the addition is completed, the mixture is warmer, under nitrogen, for one hour in an oil bath. Pyridine is distilled under vacuum, the residue is dissolved in water and alkalized to pH 9 with NaOH 5% solution. The formed oil crystallizes readily on rubbing. The solid is filtered at the pump, is washed thoroughly with water, and is dried in a vacuum drier on $CaCl_2$.

It is recrystallized from xylene or ligroin to form a white product which melts at 140–142° C. Yield 26.5 grams.

EXAMPLE V

2 - methyl - 5 - (p - nitrobenzoyl - oxy) - 8 - (β - diethyl-amino-ethoxy)-furo-(2′,3′:6,7) chromone hydrochloride.

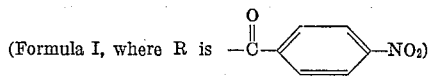

(Formula I, where R is shown above)

5 gr. 2 - methyl-5-hydroxy-8-(β - diethylamino-ethoxy)-furo-(2′,3′:6,7) chromone is dissolved in 50 cc. anhydrous pyridine in a small four-necked flask, fitted with agitator, reflux cooler, dropping funnel and bubbling pipe.

After the solution has been stirred under nitrogen, and cooled to —5° C., 3 grams p-nitrobenzoyl chloride is added little by little. Once the addition is completed, the mixture is moderately warmed to reach boiling temperature within 30 minutes; the formation of a precipitate is observed.

Warming at boiling temperature is continued for 30 minutes more, then the mixture is cooled.

The formed precipitate is collected at the pump, washed with cold pyridine, then with acetone. It is recrystallized from N,N-dimethylformamide with a yield of 6.5 grams (melting point 247–249° C.).

EXAMPLE VI

2 - methyl - 5 - (p - chlorobenzoyl - oxy) - 8 - (β - diethylamino - ethoxy) - furo - (2′,3′:6,7) chromone hydrochloride.

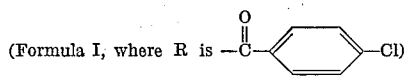

(Formula I, where R is shown above)

5 grams 2-methyl - 5 - hydroxy-8-(β-diethylamino-ethoxy)-furo-(2′,3′:6,7) chromone is dissolved in 100 cc. anhydrous pyridine in a small four-necked flask, fitted with agitator, reflux cooler, dropping funnel and bubbling pipe.

After the solution has been stirred under nitrogen, and cooled to —5° C., 3 gr. para-chlorobenzoyl chloride is added little by little.

Once the addition is completed, the mixture is refluxed for one hour.

On cooling, a solid precipitates which is collected at the pump, washed with cold pyridine, and then with acetone.

It is recrystallized from methanol: melting point 233–235° C.; yield 6.7 gr.

EXAMPLE VII

2 - methyl - 5 - (anisoyl - oxy) - 8 - (β - diethylamino-ethoxy)-furo-(2′,3′:6,7) chromone hydrochloride.

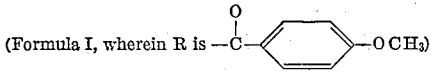

(Formula I, wherein R is shown above)

5 grams 2-methyl - 5 - hydroxy-8-(β-diethylamino-ethoxy)-furo-(2′,3′:6,7) chromone is dissolved in 50 cc. anhydrous pyridine in a small four-necked flask, fitted with agitator, reflux cooler, dropping funnel and bubbling pipe.

After the solution has been stirred under nitrogen and cooled to —10° C., 3 gr. anisoyl chloride is added little by little. Once the addition has been completed, the mixture is warmed to boiling for 45 minutes; then pyridine is distilled under vacuum to reduce the volume until an incipient precipitate is formed.

The mixture is cooled to 0° C. and the formed precipitate is filtered at the pump; the precipitate is then washed with cold acetone. It is recrystallized from ethanol: melting point 190–192° C.; yield 6 gr.

EXAMPLE VIII

2 - methyl-5-(anisoyl-oxy)-8-(β-diethylamino-ethoxy)-furo-(2′,3′:6,7) chromone.

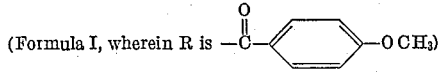

(Formula I, wherein R is shown above)

5 grams of the preceding product (Example VII) is dissolved in 20 cc. distilled water, and it is alkalized to pH 9 with NaOH 10% solution. A precipitate is formed, which is filtered at the pump and washed with water. It is recrystallized from ligroin; it forms a white product which melts at 119–121° C.

EXAMPLE IX

2 - methyl-5-(3,4,5-trimethoxybenzoyl-oxy)-8-(β-diethylamino-ethoxy)-furo-(2′,3′:6,7) chromone hydrochloride.

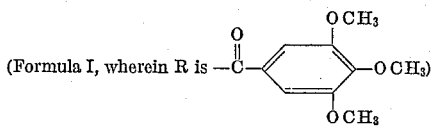

(Formula I, wherein R is shown above)

5 grams 2 - methyl-5-hydroxy-8-(β-diethylamino-ethoxy)-furo-(2′,3′:6,7) chromone is dissolved in 50 cc. anhydrous pyridine in a small four-necked flask, fitted with agitator, reflux cooler, dropping funnel and bubbling pipe.

The solution is stirred under nitrogen and cooled to 0° C.; then 4 gr. 3,4,5-trimethoxybenzoyl chloride is added little by little. The mixture is stirred, under nitrogen, for 30 minutes at room temperature, then the temperature is gradually increased, by warming in an oil bath, until boiling.

After 30 minutes' ebullition, the solution is cooled: the formation of a precipitate is observed, which is collected at the pump, washed with cold pyridine, and then with acetone. It is recrystallized from methanol: M.P. 223–225° C.; yield 8 gr.

EXAMPLE X

2 - methyl-5-(3,4,5-trimethoxybenzoyl-oxy)-8-(β-diethylamino-ethoxy)-furo-(2′,3′:6,7) chromone.

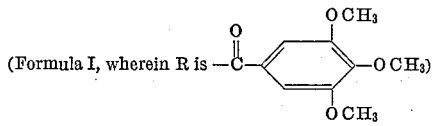

(Formula I, wherein R is shown above)

5 grams of the preceding product (Example IX) is triturated in a mortar with K₂CO₃ 20% solution; then, it is transferred into a 100 cc. flask, and shaken for 15 minutes. The formed product is filtered at the pump, and thoroughly washed with water. It is recrystallized from much ligroin to form a white product which melts at 195–197° C.

EXAMPLE XI

2 - methyl-5-(diphenyl-acetyl-oxy)-8-(β-diethylamino-ethoxy)-furo-(2′,3′:6,7) chromone hydrochloride.

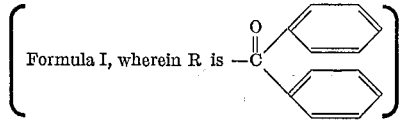

Formula I, wherein R is shown above 5 grams 2 - methyl-5-hydroxy-8-(β-diethylamino-ethoxy)-furo-(2′,3′:6,7) chromone is dissolved in 50 cc. anhydrous pyridine in a small four-necked flask fitted with agitator, reflux cooler, dropping funnel and bubbling pipe.

After the solution has been stirred under nitrogen, and cooled to —5° C., 4 gr. diphenylacetic acid chloride is added little by little. Once the addition is completed, the mixture is stirred, under nitrogen, for 30 minutes at room temperature, then the temperature is gradually increased by warming in an oil bath until boiling. After 30 minutes' ebullition, the solution is cooled to room temperature and pyridine is distilled off under high vacuum until a precipitate beigns to form. Then, the mixture is cooled to 0° C. and the formed precipitate is filtered at the pump and washed with cold acetone.

It is recrystallized from ethyl alcohol; melting point 190–192° C.; yield 6.8 gr.

EXAMPLE XII

2 - methyl-5 - (diphenyl-acetyl-oxy)-8-($\beta$-diethylamino-ethoxy)-furo-(2',3':6,7) chromone.

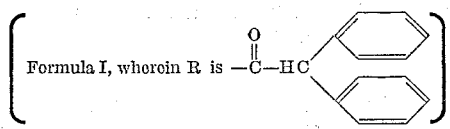

5 grams of the preceding product (Example XI) is triturated in a mortar with a $K_2CO_3$ 20% solution, then transferred into a 100 cc. flask, and shaken for 15 minutes. The formed product is filtered at the pump and thoroughly washed with water. It is recrystallized from much ligroin to form a white product melting at 144–146° C.

EXAMPLE XIII

This example relates to the production of salts.

(1) *Hydrochloride.*—20 gr. of the product of Example II were dissolved in the minimum amount of pyridine; to the well-cooled solution a cold solution containing 8 ml. of pyridine and 4.4 ml. of concentrated hydrochloric acid was added.

The white hydrochloride precipitate was collected by suction filtration and crystallized from $CH_3OH$. M.P. 221–223° C. The yield is 20 gr.

(2) *Di-methiodide.*—1 gr. of the product of Example II was cold dissolved into 15 ml. of $CH_3OH$; 0.5 gr. of $CH_3I$ were added and the solution was allowed to stand. At the end of two days a yellow precipitate was obtained which was collected by filtration at the pump and crystallized from methyl alcohol. M.P.=226–228° C.

(3) *Picrate.*—The previous process was repeated except that ethyl alcohol was used as the solvent and a picric acid solution was added. The resulting yellow precipitate at first was pitchy but, after it was allowed to stand for two days, it became crystalline. The product after crystallization had a M.P.=180–181° C.

(4) *Sulphate.*—To a suspension of 1 gr. of the product of Example II in distilled water, a diluted solution of $H_2SO_4$ was added, drop by drop, until nearly the whole base was dissolved. The solution was placed in a vacuum dessicator and after the water was completely removed, it was treated with absolute alcohol. A white precipitate was obtained which after filtration and crystallization from methyl alcohol melted at 209–211° C.

As evidence of the greatly improved properties of the present claimed compounds of the general formula:

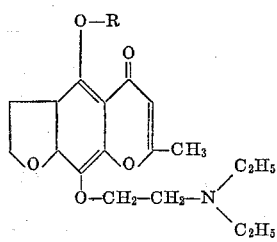

Tables I–III below compare the compound of the general formula wherein $R=-OC-CH=HC-C_5H_4N$ with the corresponding parent compound (i.e., wherein R=H). The compounds of the present invention possess outstanding coronary-extending antispastic properties, as compared to the parent compound.

TABLE I

Lethal doses 50 ($LD_{50}$) in mice, expressed in mg./kg., of 2-methyl-5-hydroxy-8-($\beta$-diethylamino-ethoxy) - furo-(2',3':6,7) chromone (R=H), and of 2 - methyl - 5- (pyridyl - 3 - acryloyl - oxy)-8-($\beta$-diethylamino-ethoxy)-furo-(2',3':6,7) chromone $$(R=-OC-CH=HC-C_5H_4N)$$

| Way of administration | $LD_{50}$ | |
|---|---|---|
| | R=H | R=—OC—CH=HC—C$_5$H$_4$N |
| Oral | 496 | 1,100 |
| Subcutaneous | 250 | 630 |
| Intraperitoneal | 108 | 207 |

TABLE II

Action on the dog arterious pressure of 2-methyl-5-hydroxy - 8 - ($\beta$ - diethylamino-ethoxy) - furo - (2'3':6,7) chromone (R=H) and of 2-methyl-5-(pyridyl-3-acryloyl-oxy)-8-($\beta$-diethylamino-ethoxy) - furo - (2',3':6,7) chromone (R=—OC—CH=HC—C$_5$H$_4$N) by intravenous administration.

| Doses in mg./kg. intravenously | Pressure drop in mm. of mercury | |
|---|---|---|
| | R=H | R=—OC—CH=HC—C$_5$H$_4$N |
| 2.5 | 15 | 0 |
| 5.0 | 40 | 0 |
| 7.5 | | 0 |
| 10.0 | | 5 |

TABLE III

Coronary-extending action on the isolated rabbit heart of 2 - methyl - 5 - hydroxy - 8 - ($\beta$-diethylamino-ethoxy)-furo - ( 2',3':6,7) chromone (R=H) and 2 - methyl - 5- (pyridyl - 3 - acryloyl - oxy) - 8 - ($\beta$ - diethylamino-ethoxy)-furo-(2',3':6,7) chromone $$(R=-OC-CH=HC-C_5H_4N)$$

| Molar concentrations | Percent changes of the coronary flux | |
|---|---|---|
| | R=H | R=—OC—CH=HC—C$_5$H$_4$N |
| $2.0\times10^{-5}$ | 0 | +7 |
| $2.5\times10^{-5}$ | 0 | +12 |
| $3.3\times10^{-5}$ | 0 | +22 |
| $5.0\times10^{-5}$ | +4 | +32 |

The following points may be concluded from the results listed in the above tables:

(1) As shown by Table I, the acute toxicity of the compound of the present invention was about ½ that of the parent compound—i.e., the $LD_{50}$ of the compound $$(R=-OC-CH=HC-C_5H_4N)$$

was twice of that of the parent compounds (R=H).

(2) As shown by Table II, the intravenous administration to dogs of the compound $$(R=-OC-CH=HC-C_5H_4N)$$

does not modify the arterious pressure at levels of up to 7.5 mg./kg. while the parent compound (R=H) lowers the pressure very sharply at levels as low as 2.5 mg./kg. and has decreases as high as 40 mm. Hg at levels of 5 mg./kg.

(3) As shown in Table III, the compound $$(R=-OC-CH=HC-C_5H_4N)$$

caused flux increments much higher than those induced by the parent compound (R=H) on isolated rabbit hearts.

Summarizing, the compounds of the present invention, in comparison with the parent hydroxy compound, have lower toxicity, a higher coronary-extending action and lower hypotensive effect (an effect which is undesirable in such drugs) and therefore has distinct improved advantages over the parent compound.

Obviously, many modifications and variations of the present invention are possible in the light of the above teachings. It is therefore to be understood that within the scope of the appended claims the invention may be practiced otherwise than as specifically described.

What is claimed is:

1. 2-methyl-5-(pyridyl-3-carbonyl-oxy)-8-(β-diethylamino-ethoxy)-furo-(2′,3′:6,7) chromone.
2. 2-methyl-5-(pyridyl-3-acryloyl-oxy)-8-(β-diethylamino-ethoxy)-furo-(2′,3′:6,7) chromone.

References Cited

Burger: "Medicinal Chemistry," 2nd ed., Interscience, p. 497, 1960.

Schonberg et al.: J. Org. Chem., vol. 22, pp. 1698–1699 (1957).

HENRY R. JILES, Primary Examiner

A. L. ROTMAN, Assistant Examiner

U.S. Cl. X.R.

260—279, 287, 295.5, 302, 308, 309, 309.7, 310, 315, 326.3, 345.2, 999